United States Patent [19]

Chan et al.

[11] Patent Number: 4,529,160

[45] Date of Patent: Jul. 16, 1985

[54] STANDING ADJUSTABLE DECORATIVE STRUCTURE

[76] Inventors: David M. F. Chan, 1213 King Dr., El Cerrito, Calif. 94530; Michael L. F. Chan, 1407 Arch St., Berkeley, Calif. 94708

[21] Appl. No.: 645,541

[22] Filed: Aug. 28, 1984

Related U.S. Application Data

[63] Continuation-in-part of Ser. No. 509,965, Jun. 30, 1983, abandoned.

[51] Int. Cl.[3] .......... F16M 11/38

[52] U.S. Cl. .......... 248/436; 248/163.1; 248/167; 431/295

[58] Field of Search .......... 431/295; 248/163.1, 248/167, 436, 528, 425, 188

[56] References Cited

U.S. PATENT DOCUMENTS 3,929,230 12/1975 Lutai .......... 431/295

4,445,845 5/1984 Serizawa .......... 431/295

*Primary Examiner*—Carroll B. Dority, Jr.

*Attorney, Agent, or Firm*—Robert R. Tipton

[57] ABSTRACT

Three or more vertical posts or decorative support members are connected to the ends of three or more articulable, serially connected linkage members by a base support pin or member proximate the bottom end of each of the vertical posts through the holes in the ends of the linkage members. The linkage members are disposed parallel to the supporting surface having their free and overlapping ends connected between the bottom end of the vertical post and the base support pin. The vertical posts are each provided with a receptacle for holding a decorative or utilitarian object proximate the top thereof. The vertical posts can be of various lengths to achieve a variety of decorative effects. The linkage members are arranged at an angle to each other to provide 3 or more points of support for the assembled structure.

3 Claims, 6 Drawing Figures

STANDING ADJUSTABLE DECORATIVE STRUCTURE

CROSS REFERENCE TO RELATED APPLICATION

This is a continuation-in-part of application Ser. No. 6/509,965, filed June 30, 1983, now abandoned.

BACKGROUND OF THE PRIOR ART

This invention relates generally to standing decorative structures and in particular to adjustable articulable decorative article holders.

Various decorative article holders of the prior art such as candlesticks, candelabras, bud vases, etc., all required an expanded base to prevent tipping or were of a rigid and fixed design providing three or more fixed legs for support.

None of the prior art devices could be adjusted or reformed to vary the appearance of the structure as might be desired.

The device of the present invention is a free standing structure which is articulable to provide a variety of shapes and forms which can support various objects such as candles, flowers, etc.

SUMMARY OF THE INVENTION

The apparatus of the present invention comprises, basically, at least two linkage members having a hole at each end with the end of one linkage member adapted to be concentrically disposed and overlapping the end of the other linkage member, and be compressed between a base support pin and a decorative member or post, the linkage member being disposed generally parallel to the supporting surface with each linkage member being articulable and capable of being disposed at an angle to each other. An object supporting receptacle is attached proximate the top of the decorative support member or post.

It is, therefore, an object of the present invention to provide a free standing, adjustable decorative structure.

It is a further object of the present invention to provide a decorative support structure that is articulable.

It is another object of the present invention to provide a decorative free standing structure for supporting decorative objects in which the vertical structural elements can be arranged to be of various heights.

It is still a further object of the present invention to provide a decorative structure in which the vertical members are adjustable as to height.

These and other objects of the present invention will be manifest upon study of the following detailed description when taken together with the drawing.

DESCRIPTION OF THE PREFERRED EMBODIMENT

Figure 1:
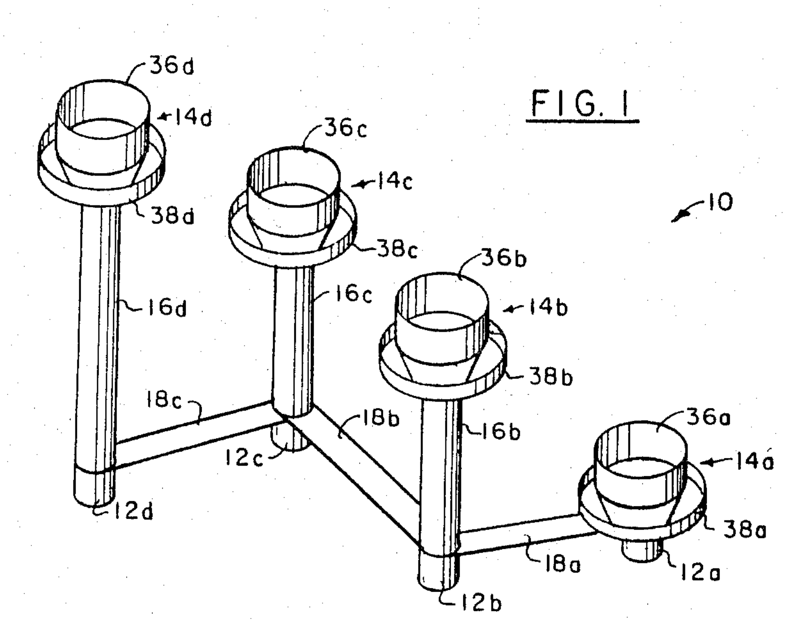
FIG. 1 is an isometric view of a typical assembled free standing, articulable decorative structure of the present invention.

With reference to FIG. 1, there is illustrated an isometric view of a typical assembled, free standing, articulable decorative structure 10 of the present invention.

Figure 2:
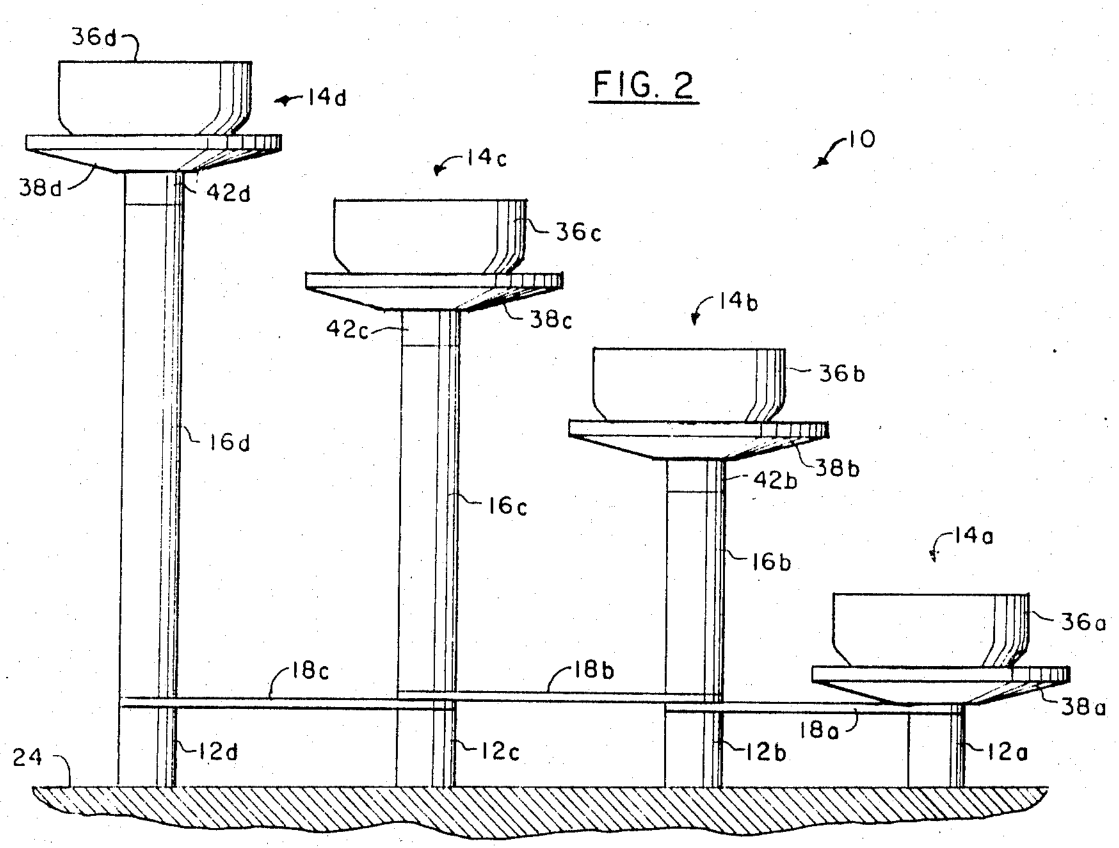
FIG. 2 is an elevational view of the typical assembled, free standing, articulable decorative structure illustrated in FIG. 1.

With reference to FIG. 2, there is illustrated an elevational view of the typical assembled free standing articulable decorative structure 10 illustrated in FIG. 1.

Decorative structure 10 comprises, basically, at least three or more base support ends 12, namely, *12a*, *12b*, *12c* and *12d*, connected, respectively, to decorative support receptacle 14, namely, *14a*, and vertical decorative support members or posts 16, namely, *16b*, *16c* and *16d*, through the ends of serially overlapping linkage members 18, namely, *18a*, *18b* and *18c*, respectively.

Additional decorative support receptacles 14, namely, *14b*, *14c* and *14d*, are connected to the top end of vertical support posts *16b*, *16c* and *16d*, respectively.

It can be seen that vertical support posts *16b*, *16c* and *16d* can be arranged to be of different fixed lengths or can comprise several serially connected modular post members (not shown) to obtain a variety of support posts having different heights to create a variety of visually pleasing structures.

Vertical support post 16 can also be telescopically adjusted (not shown) to also provide continuous adjustment of length.

Figure 4:
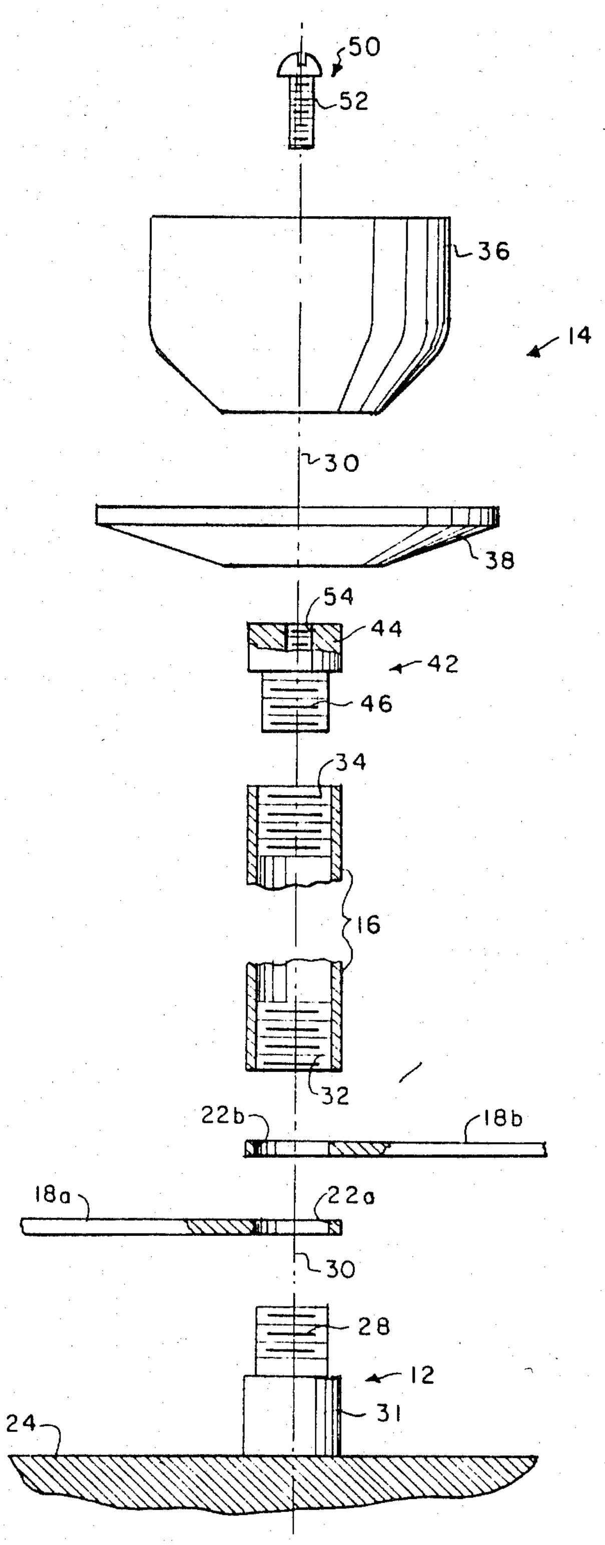
FIG. 4 is an exploded view of a single decorative support member assembly of the present invention.

As shown in FIGS. 1, 2 and 4, decorative support receptacle 14 is show comprising a decorative support receptacle cup 36 resting on a decorative support receptacle saucer 38, and being connected to the top of vertical support post 16 by decorative support connector member 42.

However, in the case of decorative support receptacle *14a*, saucer *38a* is resting directly on the end of linkage member *18a* and is connected directly to base support pin *12a*.

Decorative support receptacles *14a*, *14b*, *14c* and *14d* are shown to be capable of supporting an object such as a vase, potted plant, flower arrangement, etc. Other decorative support receptacles can be provided to support other objects such as candles, incandescent light sources or various art objects.

As previously described, decorative structure 10 also comprises two or more serially connected linkage members 18, namely *18a*, *18b* and *18c*, whose ends are overlapping and are connected between base support pins 12, namely, *12a* and saucer *38a*; *12b* and support post *16b*; *12c* and support post *16c*; and *12d* and support post *16d*.

Figure 3:
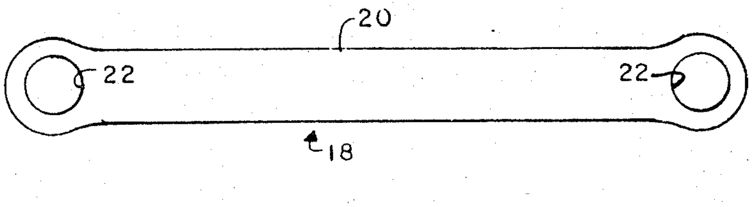
FIG. 3 is a plan view of a typical linkage member.

With reference to FIG. 3 there is illustrated a plan view of a typical linkage member 18 comprising a body portion 20 and having a hole 22 proximate each end of body portion 20 adapted to be connected between base support pin 12 and vertical support post 16 or decorative support receptacle 14 as previously described.

With reference to FIG. 4, there is illustrated an exploded view of a typical support member of decorative structure 10 showing the various parts in greater detail.

It will be noted that base support pin 12 comprises a cylindrical body section 31 and a thinner threaded connector section 28 adapted to be received by holes *22a* and *22b* proximate the ends of linkage members *18a* and *18b*, respectively.

In addition, vertical support post 16 comprises, proximate its lower end, a set of internal threads 32 adapted to engage the threads of base support pin connector section 28.

Proximate the top end of vertical support post 16 are disposed internal threads 34 adapted to engage the threads of connector member threaded section 46.

Decorative support connector member 42 comprises, therefore, a connector member main body section 44 and a connector member threaded section 46.

Proximate the top of connector member main body section 44 is disposed threaded hole 54 adapted to engage threaded section 52 of machine screw 50.

Machine screw 50 is adapted to pass through a hole (not shown) in the base of cup 36 and further hole (not shown) in the base of saucer 38 to provide a connection of cup 36 and saucer 38 to the top of decorative support connector member 42.

Thus, it can be seen when assembled, linkage members 18*a* and 18*b* can rotate about vertical axis 30 using base support pin connector section 28 as a shaft and holes 22*a* and 22*b* as bearings Thus linkage member 18*a* and 18*b* can articulate with respect to each other to define an angle as shown in FIG. 1, whereby three or more point support on supporting surface 24 will permit structure 10 to be self-supporting.

To assemble the apparatus of the present invention, again referring to FIG. 4, hole 22*a* proximate the end of linkage member 18*a* is placed around base support pin connector section 28 as is hole 22*b* proximate the end of linkage member 18*b* placed on top of linkage member 18*a* also around base support pin connector section 28.

Threads 32 on the inside surface of vertical support post 16 are placed to engage the threads of base support pin connector section 28 and screwed to compress the ends of linkage members 18*a* and 18*b* together after they have been adjusted to a desired angle typically shown in FIG. 1.

Connector member threaded section 46 is then screwed into internal threads 34 at the top end of vertical support post 16 followed by placing saucer 38 in contact with the top of decorative support connector member 44 with cup 36 next on top and machine screw 50 passing through both to engage threads 54 with threaded section 46 of machine screw 50 and the assembly tightened.

Figure 5:
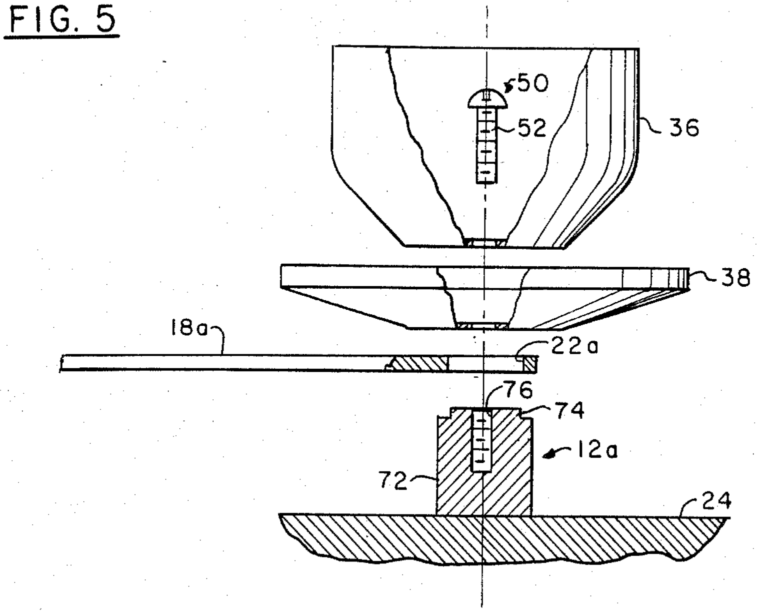
FIG. 5 is an exploded view of an embodiment of a base support pin used to connect the linkage member to the decorative support member.

With reference to FIG. 5, there is illustrated a method of connecting decorative cup 36 and saucer 38 directly to base support pin 12*a*.

In FIG. 5, base support pin 12*a* comprises a main body portion 72 having a necked down section 74 disposed proximate the top end of body portion 72. Necked down section 74 is adapted to have an outside diameter slightly smaller than the inside diameter of hole 22*a* proximate the end of linkage member 18*a* and a height or thickness approximately equal to the thickness of linkage member 18*a*.

Main body portion 72 further comprises an inside threaded hole 76 having its longitudinal axis coincident with the longitudinal axis of rotation of main body section 72 and adapted to receive threaded section 52 of machine screw 50.

Thus, as threaded section 52 passes through the holes in decorative cup 36 and saucer 38, and as necked down portion 74 is received in hole 22*a*, machine screw 50 connects main body section 72 to cup 36 and saucer 38 to create a low profile assembly.

Figure 5A:
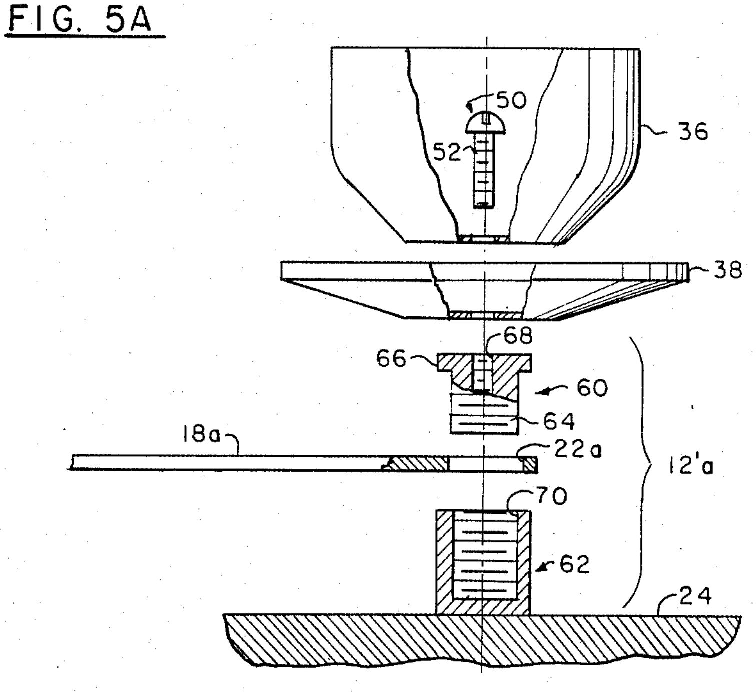
FIG. 5A is an exploded view of a further embodiment of a base support pin used to connect the linkage member to the decorative support member.

With respect to FIG. 5A, there is illustrated an exploded view of a method of connecting receptacle cup 36 and receptacle saucer 38 to base support pin 12'*a* corresponding to base support pin 12*a* of FIGS. 1, 2 and 5.

In FIG. 5A, base support pin 12*a* comprises a base support top connector member 60 adapted to connect to a base support bottom connector 62.

Base support top connector member 60 comprises a top connector main body threaded section 64 having an outside diameter slightly smaller than the inside diameter of hole 22*a* proximate the end of linkage member 18*a* and having a flange 66 disposed proximate one end of threaded section 64.

Top connector member 60 further comprises threaded hole 68 coincident with the longitudinal axis of rotation of connector member 60 and adapted to received threaded section 52 of machine screw 50.

Bottom connector member 62 comprises an internally threaded hole 70 adapted to receive top connector threaded section 64.

Thus, decorative cup 36 and saucer 38 are connected to top connector member 60 of support pin 12*a* using threaded machine screw 50 engaging hole 68. In turn, top connector threaded section 64 is adapted to pass through hole 22*a* of linkage member 18*a* and engage internally threaded hole 70 of bottom connector member 62.

Thus, linkage member 18*a* will be sandwiched between bottom connector member 62 and flange 66 of top connector member 66.

It will be noted that flange 66 can be kept fairly thin to place saucer 38 as close as possible to linkage member 18*a* to create a low profile visual impression.

Although decorative support receptacle 14 is shown as a cup and saucer combination, it could also include a configuration for holding a candle, a single bud or flower, or other receptacle designed for holding other objects of a decorative or utilitarian nature.

Also, it will be noted that base support pin 12, in certain instances, can be fabricated to be of a height or length to compensate for the thickness variation of body portion 20 of linkage member 18 where odd numbers of linkage members are used so that the base support pin at the end of the structure will cause the end of the assembled articulable support structure 10 to be level with the rest of the structure.

We claim:

1. An adjustable self-supporting structure comprising at least two linkage members having means defining a hole proximate each end of each linkage member, said hole at the end of one linkage member adapted to be concentrically disposed with respect to the hole and the end of another linkage member, a base support member, a decorative support member means for connecting said base support member to said decorative support member and concurrently engaging said concentrically disposed holes proximate the ends of said linkage members and compressing said linkage member ends together, and said linkage members being disposed in a horizontal plane at an angle to each other.

2. An adjustable self-supporting structure comprising at least two generally flat linkage members having means defining a hole proximate each end of each linkage member, said hole proximate the end of one linkage member adapted to be concentrically disposed with the hole proximate the end of another linkage member, a base support member comprising a first body member having one end adapted to engage a supporting surface, a decorative support member, a connector support member comprising a second body member adapted to attach to said decorative support member and having its other end adapted to engage said hole proximate the ends of said linkage members and connected to the other end of said base support member and compress said linkage member ends therebetween, said linkage members being disposed in a horizontal plane at an angle to each other.

3. An adjustable self-supporting structure comprising a plurality of generally flat linkage members having means defining a hole proximate each end of each linkage member, said hole proximate the end of linkage member adapted to be concentrically disposed with the hole proximate the end of another linkage member to define a plurality of serially connected linkage members, a plurality of base support members, each comprising a first body section having one end adapted to engage a supporting surface, a plurality of decorative support members, a plurality of connector support members each comprising a second body section of varying length having one end adapted to engage the concentrically disposed holes proximate the ends of said serially arranged linkage members and adapted to connect to the other end of said base support member and compress said linkage member ends therebetween, said linkage members being disposed in a horizontal plane and an angle to each other.

* * * * *